United States Patent
Gelin et al.

(10) Patent No.: US 12,396,469 B2
(45) Date of Patent: Aug. 26, 2025

(54) TASTE-MODIFYING INGREDIENT

(71) Applicant: Firmenich SA, Satigny (CH)

(72) Inventors: Jean-Luc Gelin, Satigny (CH);
Maxime Delattre, Satigny (CH)

(73) Assignee: Firmenich SA, Satigny (CH)

( * ) Notice: Subject to any disclaimer, the term of this patent is extended or adjusted under 35 U.S.C. 154(b) by 613 days.

(21) Appl. No.: 17/211,344

(22) Filed: Mar. 24, 2021

(65) Prior Publication Data

US 2021/0204578 A1 Jul. 8, 2021

Related U.S. Application Data

(63) Continuation of application No. 16/165,165, filed on Oct. 19, 2018, now abandoned, which is a continuation of application No. 15/967,905, filed on May 1, 2018, now abandoned, which is a continuation of application No. 14/901,389, filed as application No. PCT/EP2014/061417 on Jun. 3, 2014, now abandoned.

(60) Provisional application No. 61/840,401, filed on Jun. 27, 2013.

(51) Int. Cl.
| A23L 27/20 | (2016.01) |
| A23F 5/40 | (2006.01) |
| A23L 2/02 | (2006.01) |
| A23L 2/60 | (2006.01) |
| A23L 27/00 | (2016.01) |
| A23L 27/10 | (2016.01) |
| A23L 27/12 | (2016.01) |
| A23L 27/30 | (2016.01) |

(52) U.S. Cl.
CPC ............ *A23L 27/2052* (2016.08); *A23F 5/40* (2013.01); *A23L 2/02* (2013.01); *A23L 2/60* (2013.01); *A23L 27/13* (2016.08); *A23L 27/33* (2016.08); *A23L 27/86* (2016.08); *A23L 27/88* (2016.08); *A23V 2002/00* (2013.01)

(58) Field of Classification Search
CPC ...... A23L 27/2052; A23L 27/88; A23L 27/86; A23L 27/33; A23L 27/13; A23L 2/02; A23L 2/60; A23F 5/40; A23V 2002/00
USPC ........................................................ 426/536
See application file for complete search history.

(56) References Cited

U.S. PATENT DOCUMENTS 9,000,054 B2 * 4/2015 Tachdjian ................ A23L 2/56
426/546

FOREIGN PATENT DOCUMENTS

EP 1782701 * 5/2007

OTHER PUBLICATIONS

Gaudette, N. J. and Pickering, G. J., "Modifying Bitterness in Functional Food Systems," Critical Reviews in Food Science and Nutrition, 53:464-481 (2013) (Year: 2013).*

* cited by examiner

*Primary Examiner* — Jeffrey P Mornhinweg
(74) *Attorney, Agent, or Firm* — Robert S. Dailey

(57) ABSTRACT

Use of 7-[4,5-dihydroxy-6-(hydroxymethyl)-3-(3,4,5-trihydroxy-6-methyloxan-2-yl)oxyoxan-2-yl]oxy-5-hydroxy-2-(4-hydroxyphenyl)chromen-4-one (rhoifolin) as a taste modifying ingredient in order to reduce bitterness and/or increase sweetness of a foodstuff or beverage.

4 Claims, No Drawings

TASTE-MODIFYING INGREDIENT

CROSS-REFERENCE TO RELATED APPLICATIONS

The present application is a continuation of U.S. patent application Ser. No. 16/165,165, filed Oct. 19, 2018, which is a continuation of U.S. patent application Ser. No. 15/967,905, filed May 1, 2018, which is a continuation of U.S. patent application Ser. No. 14/901,389, filed Dec. 28, 2015, which is a United States national stage application of PCT Application No. PCT/EP2014/061417, filed Jun. 3, 2014, which claims the benefit of priority of U.S. Provisional Application No. 61/840,401, filed Jun. 27, 2013.

TECHNICAL FIELD

The present invention relates to a taste-modifying ingredient. The invention further relates to the use of the taste-modifying ingredients in a foodstuff and a taste-modifying composition comprising the taste-modifying ingredient.

BACKGROUND AND PRIOR ART

Sugar is a popular sweetening additive in human food preparation. By sugar is understood sucrose but also other commonly used calorie rich sweetening additives such as glucose, fructose and high fructose corn syrups. Popular feeding habits tend to show an over consumption of sugar even though it is well established that this is a known cause of various adverse effects on health, the most common including tooth decay and obesity.

To date, various products have been proposed which seek to address these problems. For instance, artificial high intensity sweeteners have been developed which deliver a sweet taste at very low doses. Of the high intensity sweeteners already present on the market, Sucralose®, Aspartame, Potassium Acesulfame, cyclamate, saccharine can be named as well known alternatives. However, there is a strong desire by an ever-increasing number of consumers for natural or naturally derived products in preference to their artificial counterparts. Thus, it would be highly desirable to provide a product which meets this consumer need.

Within the class of naturally occurring sweeteners, a growing number of products is becoming available. Examples include thaumatin, luo han guo, brazzein, curculin, glycyrrhizin and stevia.

Rhoifolin is a compound found in the juice of citrus bergamia (bergamot). To the best of our knowledge, this compound has never been identified as a taste-modifying ingredient for increasing sweetness.

It would also be desirable to reduce the bitterness of certain foodstuffs and beverages. To the best of our knowledge, rhoifolin has never been identified as a taste-modifying ingredient for reducing bitterness.

SUMMARY OF THE INVENTION

Thus, according to the present invention, there is provided the use of 7-[4,5-dihydroxy-6-(hydroxymethyl)-3-(3,4,5-trihydroxy-6-methyloxan-2-yl)oxyoxan-2-yl]oxy-5-hydroxy-2-(4-hydroxyphenyl)chromen-4-one as a taste modifying ingredient.

For the purposes of the present invention, 7-[4,5-dihydroxy-6-(hydroxymethyl)-3-(3,4,5-trihydroxy-6-methyloxan-2-yl)oxyoxan-2-yl]oxy-5-hydroxy-2-(4-hydroxyphenyl)chromen-4-one is also referred to herein as "rhoifolin".

The invention further provides a taste modifying composition comprising an effective amount of rhoifolin.

The invention also provides a method of reducing or masking bitterness of a foodstuff or beverage by adding rhoifolin thereto.

The invention also provides a method of increasing the sweetness of a foodstuff or beverage by adding rhoifolin thereto.

DETAILED DESCRIPTION OF THE INVENTION

In a foodstuff or beverage, rhoifolin may be present in amounts within the ranges of from 5 to 300 ppm.

Preferably rhoifolin is present at a concentration of from 5 to 200 ppm, more preferably 5 to 150 ppm, most preferably from 10 to 100 ppm.

Rhoifolin is commercially available and can be purchased from, for example, Interquim, Spain.

Rhoifolin can be used in a many products where there is a desire to reduce bitterness and/or to increase sweetness. Examples include but are not limited to tea, coffee, fruit juice and fruit-flavoured beverages, jams and jellies, peanut butter, pies, puddings, cereals, candies, ice creams, yogurts, bakery products; health care products, such as toothpastes, mouthwashes, cough drops, cough syrups; chewing gums; and sugar substitutes.

The invention will now be illustrated with reference to the following examples. All amounts are % by weight unless otherwise indicated.

EXAMPLES

Example 1

Application of Rhoifolin in Grapefruit Juice

Various samples were prepared using the ingredients shown in the table below (the amounts are % by weight).

TABLE 1

| Sample | Grapefruit Juice (1) | Rhoifolin (2) |
| --- | --- | --- |
| 5 | 99.9 | 0.1 |
| 6 | 99.6 | 0.4 |
| 7 | 99.2 | 0.8 |
| 8 | 98.8 | 1.2 |
| 9 | 98.4 | 1.6 |
| 10 | 98.0 | 2.0 |
| B | 100 | 0 |

(1) Eco+, purchased at Leclerc, France
(2) ex Interquim, Spain

The rhoifolin was weighed into sufficient propylene glycol (PG) to allow for full dissolution and heated in a water bath at 40° C. for 30 minutes until the rhoifolin was fully solubilised. The grapefruit juice was then mixed with the rhoifolin solution and the mixtures were kept at room temperature for 1 hour before sensory tests.

The sensory tests were performed as follows:
  6 trained panellists were asked to rate the sweetness, bitterness and flavor intensity of the samples prepared above under blind conditions using a 5 point intensity rating scale where 0 indicates no intensity and 5 indicates extremely intense.

Average intensity scores were treated for mean comparison Duncan testing using a FIZZ statistic software.

The results are given in the following table:

TABLE 2

| Sample | Bitterness Intensity | Sweetness Intensity | Flavor Intensity | Rhoifolin (ppm) |
|---|---|---|---|---|
| B | 4.17 | 2.25 | 3.50 | 0 |
| 5 | 3.83 | 2.42 | 3.67 | 5 |
| 6 | 3.33 | 2.50 | 3.33 | 20 |
| 7 | 3.08 | 2.75 | 3.25 | 40 |
| 8 | 3.08 | 3.17 | 3.08 | 60 |
| 9 | 2.67 | 3.50 | 3.17 | 80 |
| 10 | 2.33 | 4.00 | 3.33 | 100 |

The results demonstrate that addition of rhoifolin reduces bitterness and increased sweetness whilst leaving the flavor intensity substantially unchanged.

Example 2

Application of Rhoifolin in a Sucrose-Free Coffee Product

Various samples were prepared using the ingredients shown in the table below (the amounts are % by weight).

TABLE 3

| Sample | Water (1) | Instant soluble Coffee (2) | Rhoifolin (3) |
|---|---|---|---|
| 1 | 99.4 | 0.5 | 0.1 |
| 2 | 99.55 | 0.05 | 0.4 |
| 3 | 98.7 | 0.5 | 0.8 |
| 4 | 98.3 | 0.5 | 1.2 |
| A | 100 | 0 | 0 |

(1) Still Mineral Water, ex Arkina, Switzerland
(2) Commercially available instant soluble coffee, purchased in Migros, Switzerland
(3) ex Interquim, Spain The rhoifolin was weighed into sufficient propylene glycol (PG) to allow for full dissolution and heated in a water bath at 40° C. for 30 minutes until the rhoifolin was fully solubilised.

The instant soluble coffee was weighed and incorporated into the water. Solubilisation was achieved at room temperature.

The mixtures were kept at room temperature for 1 hour before sensory tests.

The sensory tests were performed as follows:

6 trained panellists were asked to rate the sweetness, bitterness and coffee-like intensity of the samples prepared above under blind conditions using a 5 point intensity rating scale where 0 indicates no intensity and 5 indicates extremely intense.

Average intensity scores were treated for mean comparison Duncan testing using a FIZZ statistic software.

The results are given in the following table:

TABLE 4

| Sample | Bitterness Intensity | Sweetness Intensity | Coffee-like Intensity | Rhoifolin (ppm) |
|---|---|---|---|---|
| A | 3.33 | 0.33 | 2.83 | 0 |
| 1 | 3.33 | 0.33 | 2.83 | 5 |
| 2 | 2.58 | 0.67 | 2.92 | 20 |
| 3 | 2.33 | 1.83 | 2.75 | 40 |
| 4 | 2.00 | 2.58 | 2.33 | 60 |

The results demonstrate that it is preferable that more than 5 ppm of rhoifolin is present for certain applications.

What is claimed is:

1. A method of reducing bitterness of a foodstuff or beverage, the method comprising introducing a taste-modifying ingredient to a foodstuff or beverage in an amount effective to reduce a bitter taste, wherein the taste-modifying ingredient is 7-[4,5-dihydroxy-6-(hydroxymethyl)-3-(3,4,5-trihydroxy-6-methyloxan-2-yl)oxyoxan-2-yl]-oxy-5-hydroxy-2-(4-hydroxyphenyl)-chromen-4-one.

2. The method of claim 1, wherein the taste modifying ingredient is present in the foodstuff or beverage at a concentration ranging from 5 to 100 ppm.

3. A method of enhancing sweetness of a foodstuff or beverage, the method comprising introducing a taste-modifying ingredient to a foodstuff or beverage in an amount effective to enhance a sweet taste, wherein the taste-modifying ingredient is 7-[4,5-dihydroxy-6-(hydroxymethyl)-3-(3,4,5-trihydroxy-6-methyloxan-2-yl)oxyoxan-2-yl]-oxy-5-hydroxy-2-(4-hydroxyphenyl)-chromen-4-one.

4. The method of claim 3, wherein the taste modifying ingredient is present in the foodstuff or beverage at a concentration ranging from 5 to 100 ppm.

\* \* \* \* \*